US007885899B1

(12) United States Patent
Sancho

(10) Patent No.: US 7,885,899 B1
(45) Date of Patent: Feb. 8, 2011

(54) SYSTEM AND METHOD FOR SECURE NETWORK PURCHASING

(75) Inventor: Enrique David Sancho, Zichron Yaacov (IL)

(73) Assignee: iPass Inc., Redwood Shores, CA (US)

( * ) Notice: Subject to any disclaimer, the term of this patent is extended or adjusted under 35 U.S.C. 154(b) by 0 days.

(21) Appl. No.: 09/500,601

(22) Filed: Feb. 8, 2000

(51) Int. Cl.
*H04L 9/00* (2006.01)

(52) U.S. Cl. .......................... 705/67; 705/50; 713/186; 713/173

(58) Field of Classification Search ............... 705/1, 705/50, 67; 713/186
See application file for complete search history.

(56) References Cited

U.S. PATENT DOCUMENTS

| 4,688,169 A | 8/1987 | Joshi |
| 4,736,422 A | 4/1988 | Mason |
| 4,796,220 A | 1/1989 | Wolfe |
| 4,885,777 A | 12/1989 | Takaragi et al. |
| 4,926,480 A | 5/1990 | Chaum |
| 4,991,210 A | 2/1991 | Chaum |
| 5,005,200 A | 4/1991 | Fischer |
| 5,018,196 A | 5/1991 | Takaragi et al. |
| 5,023,907 A | 6/1991 | Johnson et al. |
| 5,131,039 A | 7/1992 | Chaum |
| 5,196,840 A | 3/1993 | Leith et al. |
| 5,214,702 A | 5/1993 | Fischer |
| 5,218,637 A | 6/1993 | Angebaud et al. |
| 5,311,595 A | 5/1994 | Bjerrum et al. |
| 5,335,278 A | 8/1994 | Matchett et al. |

(Continued)

FOREIGN PATENT DOCUMENTS

JP 10-229980 9/1998

(Continued)

OTHER PUBLICATIONS

Chaum, D., "Achieving Electronic Privacy", *Scientific American*, 267(2), (Aug. 1992),8 pages.

(Continued)

*Primary Examiner*—Calvin L Hewitt, II
*Assistant Examiner*—John M Winter
(74) *Attorney, Agent, or Firm*—DeLizio Gilliam, PLLC

(57) ABSTRACT

There is disclosed a method for performing secure electronic transactions on a computer network, the network comprising a buyer's computer, a vendor server, a creditor server and a security server. The buyer's computer has a fingerprint file stored in the memory thereof. The method includes the steps of:

i) the buyer computer requesting to purchase merchandise to the vendor server, the purchase request including said buyer computer's IP address;

ii) the buyer computer selecting a predetermined form of secured payment method;

iii) the payment method selection causing the vendor server to transmit to the security server a request for confirmation of the buyer computers identity at the buyer computer's IP address;

iv) the confirmation request causing the security server to send a retrieval request to the IP address, the retrieval request including a retrieval program for detecting and retrieving the buyer's computer's fingerprint file, and the retrieval request further comprising a response request asking for confirmation of the purchase request; whereby a positive response from the buyer's computer to the security server accompanied by the fingerprint file causes the security server to confirm the buyer computer's identity to the vendor server and to approve the purchase.

15 Claims, 8 Drawing Sheets

U.S. PATENT DOCUMENTS

| | | | | |
|---|---|---|---|---|
| 5,351,293 | A | | 9/1994 | Michener et al. |
| 5,416,840 | A | * | 5/1995 | Cane et al. ..................... 705/52 |
| 5,442,707 | A | | 8/1995 | Miyaji et al. |
| 5,450,489 | A | | 9/1995 | Ostrover et al. |
| 5,502,765 | A | | 3/1996 | Ishiguru et al. |
| 5,513,260 | A | | 4/1996 | Ryan |
| 5,513,272 | A | * | 4/1996 | Bogosian, Jr. ............... 235/382 |
| 5,515,441 | A | | 5/1996 | Faucher |
| 5,548,106 | A | * | 8/1996 | Liang et al. ................. 235/454 |
| 5,559,887 | A | | 9/1996 | Davis et al. |
| 5,648,648 | A | | 7/1997 | Chou et al. |
| 5,657,389 | A | | 8/1997 | Houvener |
| 5,745,568 | A | | 4/1998 | O'Connor et al. |
| 5,794,221 | A | | 8/1998 | Egendorf |
| 5,809,143 | A | | 9/1998 | Hughes |
| 5,825,883 | A | * | 10/1998 | Archibald et al. ............. 705/53 |
| 5,845,267 | A | * | 12/1998 | Ronen ................... 379/114.19 |
| 5,852,812 | A | | 12/1998 | Reeder |
| 5,899,980 | A | * | 5/1999 | Wilf et al. ..................... 705/26 |
| 5,903,721 | A | | 5/1999 | Sixtus |
| 5,905,736 | A | * | 5/1999 | Ronen et al. ................. 370/352 |
| 5,907,617 | A | | 5/1999 | Ronning |
| 5,920,628 | A | * | 7/1999 | Indeck et al. ................. 360/25 |
| 5,926,624 | A | | 7/1999 | Katz et al. |
| 5,933,497 | A | * | 8/1999 | Beetcher et al. ............... 705/59 |
| 5,949,877 | A | | 9/1999 | Traw et al. |
| 6,026,166 | A | | 2/2000 | LeBourgeois |
| 6,029,151 | A | * | 2/2000 | Nikander ..................... 380/33 |
| 6,041,411 | A | | 3/2000 | Wyatt |
| 6,072,875 | A | * | 6/2000 | Tsudik ....................... 380/270 |
| 6,138,239 | A | | 10/2000 | Veil |
| 6,167,518 | A | * | 12/2000 | Padgett et al. ............... 713/186 |
| 6,195,447 | B1 | * | 2/2001 | Ross .......................... 382/125 |
| 6,269,348 | B1 | | 7/2001 | Pare, Jr. et al. |
| 6,270,011 | B1 | * | 8/2001 | Gottfried .................... 235/379 |
| 6,272,631 | B1 | * | 8/2001 | Thomlinson et al. ........ 713/155 |
| 6,332,193 | B1 | | 12/2001 | Glass et al. |
| 6,367,012 | B1 | | 4/2002 | Atkinson et al. |
| 6,466,671 | B1 | * | 10/2002 | Maillard et al. ............. 380/227 |
| 6,606,707 | B1 | | 8/2003 | Hirota et al. |
| 6,671,805 | B1 | * | 12/2003 | Brown et al. ................ 713/176 |
| 6,857,076 | B1 | * | 2/2005 | Klein .......................... 713/189 |
| 6,920,561 | B1 | * | 7/2005 | Gould et al. ................ 713/186 |
| 7,366,702 | B2 | | 4/2008 | David |
| 2001/0000535 | A1 | | 4/2001 | Lapsley et al. |
| 2001/0056539 | A1 | * | 12/2001 | Pavlin et al. ................. 713/193 |
| 2002/0174067 | A1 | | 11/2002 | Hoffman et al. |
| 2004/0128249 | A1 | | 7/2004 | Hoffman |
| 2004/0254890 | A1 | | 12/2004 | Sancho et al. |
| 2005/0108177 | A1 | | 5/2005 | Sancho |

FOREIGN PATENT DOCUMENTS

| | | |
|---|---|---|
| WO | WO98/47116 | 10/1998 |
| WO | WO 98/47116 | 10/1998 |
| WO | WO 98/59455 | 12/1998 |
| WO | WO98/59455 | 12/1998 |
| WO | WO99/31610 | 6/1999 |
| WO | WO 99/31610 | 6/1999 |
| WO | PCT/US00/21058 | 7/2000 |

OTHER PUBLICATIONS

Cisco, "Kerberos Overview—An Authentification Service for Open Network Systems", Updated Jan. 14, 2003, Document ID: 16087.

Gollmann, D., "What do we mean by Entity Authentication?", *IEEE Symposium on Security and Privacy*, (May 1996), 46-54.

McGhaw, L., "Connx Security White Paper", *Solutions IQ*, (Oct. 13, 1997).

Medvinsky, G., et al., "NetCash: a Design for Practical Electronic Currency on the Internet", *Information Sciences Institute*, California, (Mar. 1995), 5 pgs.

Needham, R., et al., "Using Encryption for Authentification in Large Networks of Computers", *Operating Systems 21* (12), Palo Alto Research Center,(Dec. 1978), 993-99.

Newman, B. Clifford, et al., "Proxy-Based Authorization and Accounting for Distribution Systems", *Proceedings of the 13th International Conference on Distribution Computing Systems*, (May 1993), 9 pages.

Newman, B. Clifford, et al., "Requirements for Network Payment: The NetChecque Perspective,", *Proceedings of IEEE Compcon '95*, (Mar. 1995), 5 pgs.

Nicomette, V., et al., "An Authorization Scheme for Distributed Object Systems", *Proceedings of IEEE Symposium on Security and Privacy*, (May 1977), 21-30.

Sirbu, M, et al., "NetBill: An Internet Commerce System Optimized for Network Delivererd Services", *Compcon '95*, (Mar. 1995), 20-35.

Tenenbaum, J., et al., "Spontaneous Electronic Commerce on the Internet", *Compcon '95*, (Mar. 1995).

Tung, B, "The Moron's Guide to Kerberos, Version 1.2.2", http://www.isi.edu/gost/brian/security/kerberos.html, (Mar. 9, 2003), 1-11.

Wenbo, M, "On two proposals for On-Line Bankcard Payments using Open Networks: Problems and Solutions", Oakland, CA,(May 1996).

"Authentication in an Electronic Banking Environment", *Federal Financial Institutions Examination Council*, www.ffiec.gov/pdf/authentication_guidance.pdf,(Aug. 8, 2001).

"U.S. Appl. No. 09/875,795, Notice of Allowance Mailed Dec. 7, 2007", 11 pgs.

"U.S. Appl. No. 10/688,734, Response filed Apr. 23, 2008 to Non-Final Office Action mailed Feb. 25, 2008", 6 pgs.

"U.S. Appl. No. 10/688,734, Final Office Action Mailed Feb. 25, 2008", 8 pgs.

"U.S. Appl. No. 10/688,734, Response filed Nov. 27, 2007 to Non-Final Office Action mailed Oct. 31, 2007", 8 pgs.

"U.S. Appl. No. 10/688,734, Non-Final Office Action Mailed Oct. 31, 2007", OARN,7 pgs.

"U.S. Appl. No. 10/444,506 Final Office Action mailed Sep. 11, 2008", FOAR,13 Pgs.

"U.S. Appl. No. 10/688,734, Response filed Sep. 15, 2008 to Non Final Office Action mailed Jun. 27, 2008", 6 pgs.

"U.S. Appl. No. 10/688,734, Non-Final Office Action mailed Jun. 27, 2008", 7 pgs.

U.S. Appl. No. 09/523,902, David, Sancho E.

U.S. Appl. No. 09/564,660, David, Sancho E.

"U.S. Appl. No. 10/444,506 Final Office Action", Apr. 8, 2009, 13 pages.

"U.S. Appl. No. 10/688,734 Office Action", Jul. 24, 2009, 9 pages.

"U.S. Appl. No. 10/688,734 Final Office Action", Mar. 12, 2010.

"U.S. Appl. No. 10/688,734 Final Office Action mailed Apr. 19, 2007", 6.

"U.S. Appl. No. 10/688,734 Non Final Office Action mailed May 4, 2006", 5.

"U.S. Appl. No. 09/875,795 Non Final Office Action mailed Jan. 23, 2006", 4 pgs.

"U.S. Appl. No. 09/875,795 Non Final Office Action mailed Aug. 26, 2005", 4 pgs.

"U.S. Appl. No. 09/875,795 Non Final Office Action mailed Oct. 5, 2004", 10 pgs.

"U.S. Appl. No. 09/875,795 Notice of Allowance mailed Feb. 15, 2007", 9 pgs.

"U.S. Appl. No. 09/875,795 Notice of Allowance mailed May 22, 2007", 9 pgs.

"U.S. Appl. No. 09/875,795 Notice of Allowance mailed Sep. 5, 2006", 14 pgs.

"U.S. Appl. No. 09/875,795 Response filed Jan. 5, 2005 to Non-Final Office Action mailed Oct. 5, 2004", 7 pgs.

"U.S. Appl. No. 09/875,795 Response filed Apr. 23, 2006 to Non Final Office Action mailed Jan. 23, 2006", 9 pgs.

"U.S. Appl. No. 09/875,795 Response filed Oct. 25, 2005 to Non Final Office Action mailed Aug. 26, 2005", 7 pgs.

"U.S. Appl. No. 10/776,954 non-final office action mailed Mar. 22, 2005", 12 PGS.

"U.S. Appl. No. 10/444,506 Non-Final Office Action mailed Nov. 9, 2006", 26.

"U.S. Appl. No. 10/444,506 response filed Apr. 9, 2007 to Non-Final Office Action mailed Nov. 9, 2006", 15.

"U.S. Appl. No. 10/688,734 , Non-Final Office Action mailed Dec. 17, 2004", 8.

"U.S. Appl. No. 10/688,734, Response filed Apr. 18, 2005 to Non Final Office Action mailed Dec. 17, 2004", 7.

"U.S. Appl. No. 10/688,734 Response filed May 18, 2007 to Final Office Action mailed Apr. 19, 2007", 3.

"U.S. Appl. No. 10/688,734 Non Final Office Action mailed Jun. 25, 2007", 8.

"U.S. Appl. No. 10/688,734 Non Final Office Action mailed Oct. 11, 2006", 4.

"U.S. Appl. No. 10/688,734 Non Final Office Action mailed Oct. 21, 2005", 6.

"U.S. Appl. No. 10/688,734 Response filed Jan. 10, 2006 to Non Final Office Action mailed Oct. 21, 2005", 7.

"U.S. Appl. No. 10/688,734 Response filed Jun. 27, 2006 to Non Final Office Action mailed May 4, 2006", 6.

"U.S. Appl. No. 10/776,954 Non Final Office Action mailed Mar. 22, 2005", 16.

* cited by examiner

SYSTEM AND METHOD FOR SECURE NETWORK PURCHASING

TECHNOLOGICAL FIELD OF THE INVENTION

The present invention relates to systems and methods for implementing secure purchases over a computer network. More particularly, the methods relate to a system which permits purchases of merchandise to be made over a computer network, whereby the purchaser may feel confident that personal credit card information is not at risk of being diverted, misappropriated or stolen and the merchant may be more confident that the purchaser is bona fide.

It is well known for buyers of merchandise to access the global client/server network commonly referred to as the Internet, a part of which is the World Wide Web, for the purpose of searching for and purchasing merchandise from on-line vendors selling wares ranging from travel services and investment services to buying CD recordings, books, software, computer hardware and the like.

Numerous patents have already been granted which teach methods or systems purporting to secure commercial credit card transactions carried out over the Internet. Examples of such patents include U.S. Pat. Nos. 5,671,279 to Elgamal, 5,727,163 to Bezos, 5,822,737 to Ogram, 5,899,980 to Wilf et al. and U.S. Pat. Nos. 5,715,314 and 5,909,492, both to Payne, et al., the disclosures of which are incorporated by reference herein for providing background and as indicative of the state of the art prior to the invention herein disclosed.

Most of the disclosed systems have the disadvantage that they rely on the transmission of sensitive information over unsecured network routes and lines for each transaction. Although practically-speaking, the systems which use encryption are fairly safe, there is still some risk of credit card misappropriation and there is little psychological comfort given to potential users by their knowing that encryption is being used.

Generally speaking, the Internet is a network of computers, remote from one another, linked by a variety of communications lines including telephone lines, cable television lines, satellite link-ups and the like. Internet service providers (hereinafter "ISPs") provide the link to the main backbone of the Internet for small end users. The account for the end user is established in the normal manner usually by providing credit card information to the ISP by conventional means, such as by voice telephony, fax transmission or check. In most ISP-end user relationships, the ISP has been given credit card or other credit account information, which information is on file with the ISP and available to the ISP's computers. In return for receiving payment, the ISP provides a gateway to the Internet for the end-user's use. The end-user (or subscriber) is provided with identification codes for dialling directly into the ISP's computers and software means (for example, dialler software, browser software, electronic mail software, and the like) for doing so if necessary.

Most purchases are conducted in the following manner: a purchaser using a browser application on his local client computer connects via his computers modem to a dial-up Internet Service Provider (hereinafter "ISP") and makes connections therethrough to various Web sites, Internet server locations assigned a URL (Uniform Resource Locator) address. The purchaser selects his merchandise and the vendor usually requests payment by one of several methods, one of which usually includes payment by providing credit card information.

According to surveys and other marketing data, there always has been and there still exists a high percentage of the population which is deterred from purchasing merchandise directly over the Internet. This large population apparently fears that, despite all the efforts at security and cryptography promised by the vendors, there still exists the possibility that their credit account information will be intercepted on-line by a third party computer hacker and used illegally, at great expense and trouble for the cardholder.

An additional anxiety-inducing factor related to merchandising over the Internet, or e-commerce, is that the merchant cannot always be certain that just because he has obtained credit card information, that he will actually be paid for the merchandise he ships. After all, credit card fraud and/or theft occurs regularly and may not be caught in time to stop the order from being shipped. When the cardholder discovers the theft and stops the card, it may be too late for the vendor to recover his property. At the very least, this situation leads to unnecessary aggravation and wasted resources for the merchant, credit card company and cardholder.

SUMMARY AND OBJECTS OF THE INVENTION

Thus, it is an objective of the present invention to provide a system and method for potential on-line buyers of merchandise marketed over the Internet to pay for those purchases with minimized exposure to the risk of credit card theft by electronic interception.

It is a further objective of the invention to provide a mechanism for facilitating e-commerce which will increase the confidence of the consuming public in the safety of such transactions.

It is still a further objective of the invention to provide a mechanism for facilitating e-commerce which will increase the confidence with which vendors may ship the purchased product or deliver the purchased service without fear of the payment being provided fraudulently.

It is yet a further object of the present invention to provide a site-specific and computer-specific identification confirmation system for use in a secure electronic purchasing system.

These objectives and others and others not specifically enumerated herein are achieved by the invention disclosed herein which comprises a system and method for providing payment to an on-line merchant for services or goods provided to an on-line buyer. In one exemplary embodiment, the method takes advantage of the existing business relationships between the member computers which form the structure of the Internet.

Each time a subscriber signs in to the ISP's computers for an on-line session, the subscriber is assigned an Internet Protocol (hereinafter "IP") address. The subscriber's computer transmits messages which are received by the ISP computer and relayed through the IP address and out onto the Internet to the ultimate intended recipient computer. During the entire time the on-line session in progress, the IP address does not change and is thus available as identifying information. By monitoring and occasionally re-verifying that the subscriber's computer is still on-line at the assigned IP address, the ISP can confirm that certain activities could be attributed to the subscriber.

One embodiment of the present invention takes advantage of the intimate relationship which is re-created every time an Internet subscribers computer goes online and signs into his ISP's computer by assigning to the ISP computer the function of clearinghouse and active intermediary between the subscriber's computer and the vendor's computer. A subscriber computer signs in to the ISP computer system and is recognized and assigned an IP address. When the subscriber identifies merchandise or services at a vendor's website which he wishes to purchase, he sends programming to the website which selects the items and instructs the vendor's computer to generate a purchase authorization request which is sent to the ISP computer. The purchase authorization request contains information about the merchandise to be purchased, identifying information about the proposed purchaser, some of which is the identifying information assigned by the ISP to the subscriber. The ISP confirms internally that the subscriber is still signed in to the ISP computer system by verifying the identity of the computer currently actively communicating through the IP address. When satisfied that the subscriber is still online, the ISP computer generates and sends a message to the subscriber's computer requesting confirmation of the order for the merchandise. Upon receipt from the subscriber's computer of the confirmation, the ISP generates and transmits to the vendor's computer a message confirming the order and providing a confirmation number, agreeing to pay the invoice which the vendor's computer subsequently generates and presents to the ISP computer. ISP computer then uses the subscriber's credit card information and presents an invoice against the credit card account to be sent through normal channels.

In another exemplary embodiment of the present invention, the ISP does not serve as the credit giver or transaction verifier/guarantor. This function is provided by a bank or vendor with whom the subscriber already has a credit account, and who has an online presence, i.e. has a transaction server connected to the Internet which can participate in the transaction as it is carried out by the subscriber/consumer.

BRIEF DESCRIPTION OF THE DRAWINGS

For better understanding of the invention, the following drawings are included for consideration in combination with the detailed specification which follows.

DETAILED DESCRIPTION OF THE EXEMPLARY EMBODIMENTS

Figure 1:
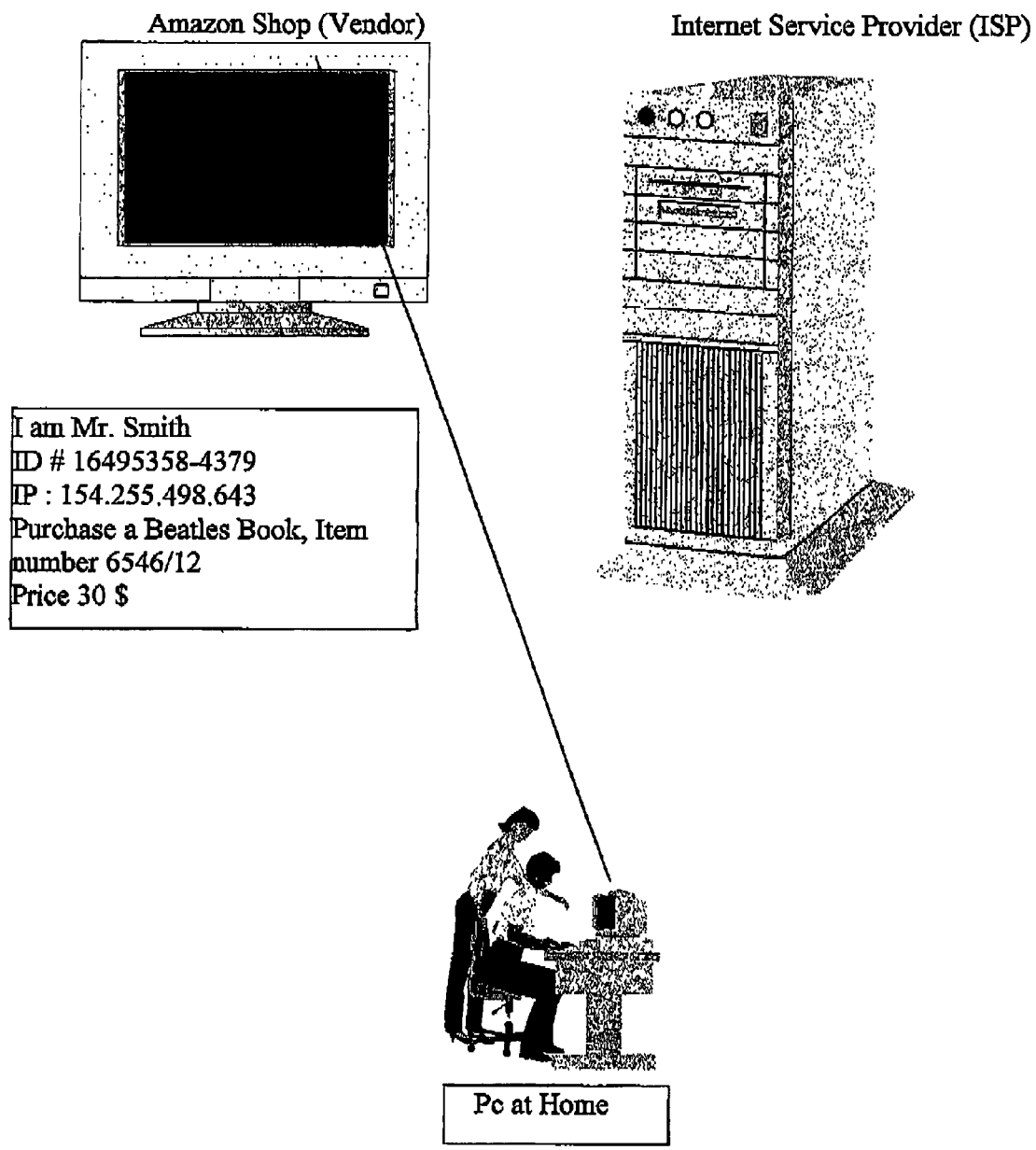
FIG. 1 shows a buyer computer in communication with a vendor computer via the ISP computer, wherein buyer computer is initiating a purchase transaction.
Figure 2:
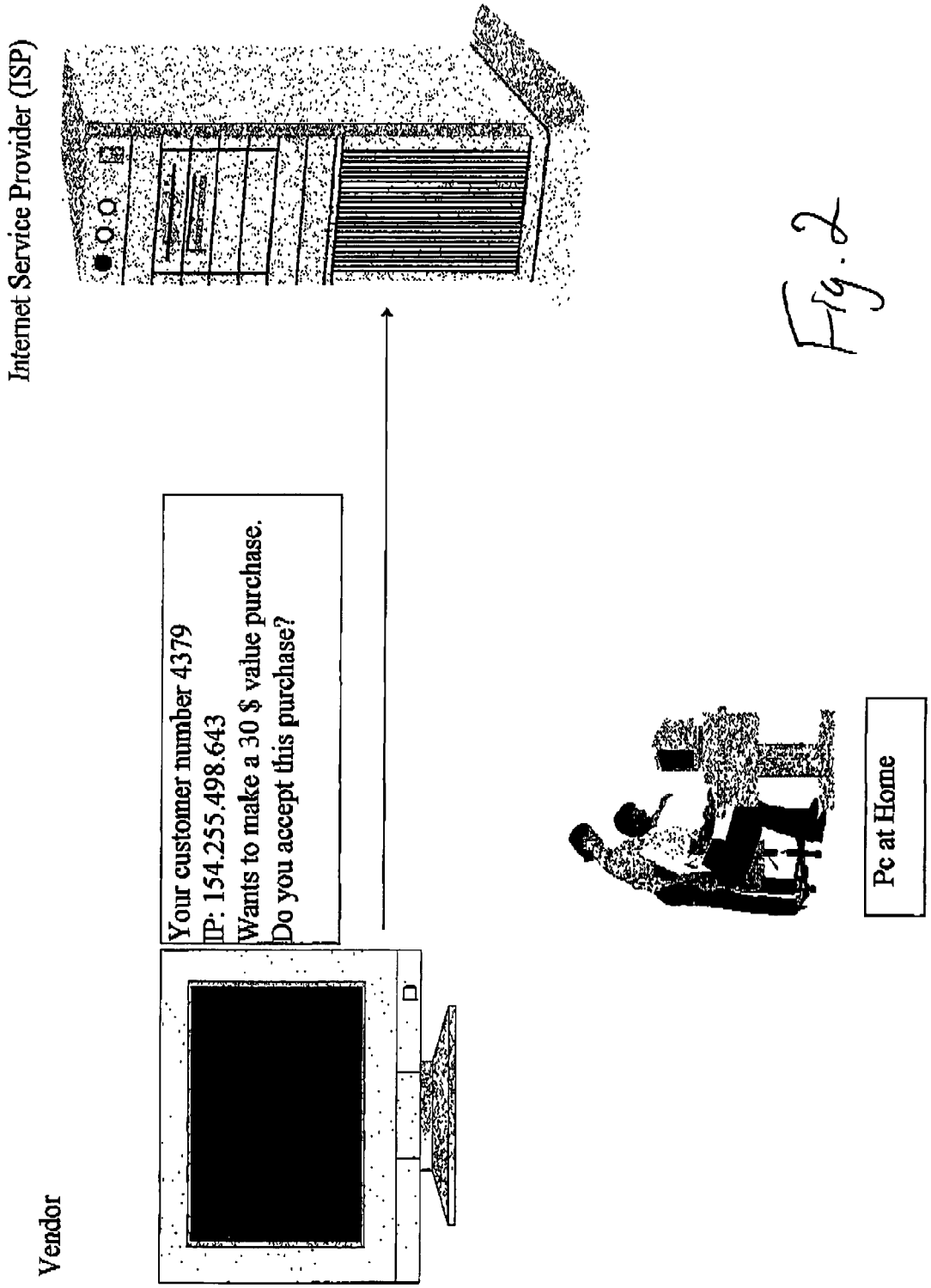
FIG. 2 shows the vendor computer communicating with the ISP computer to request authorization to complete buyer's requested transaction.
Figure 3:
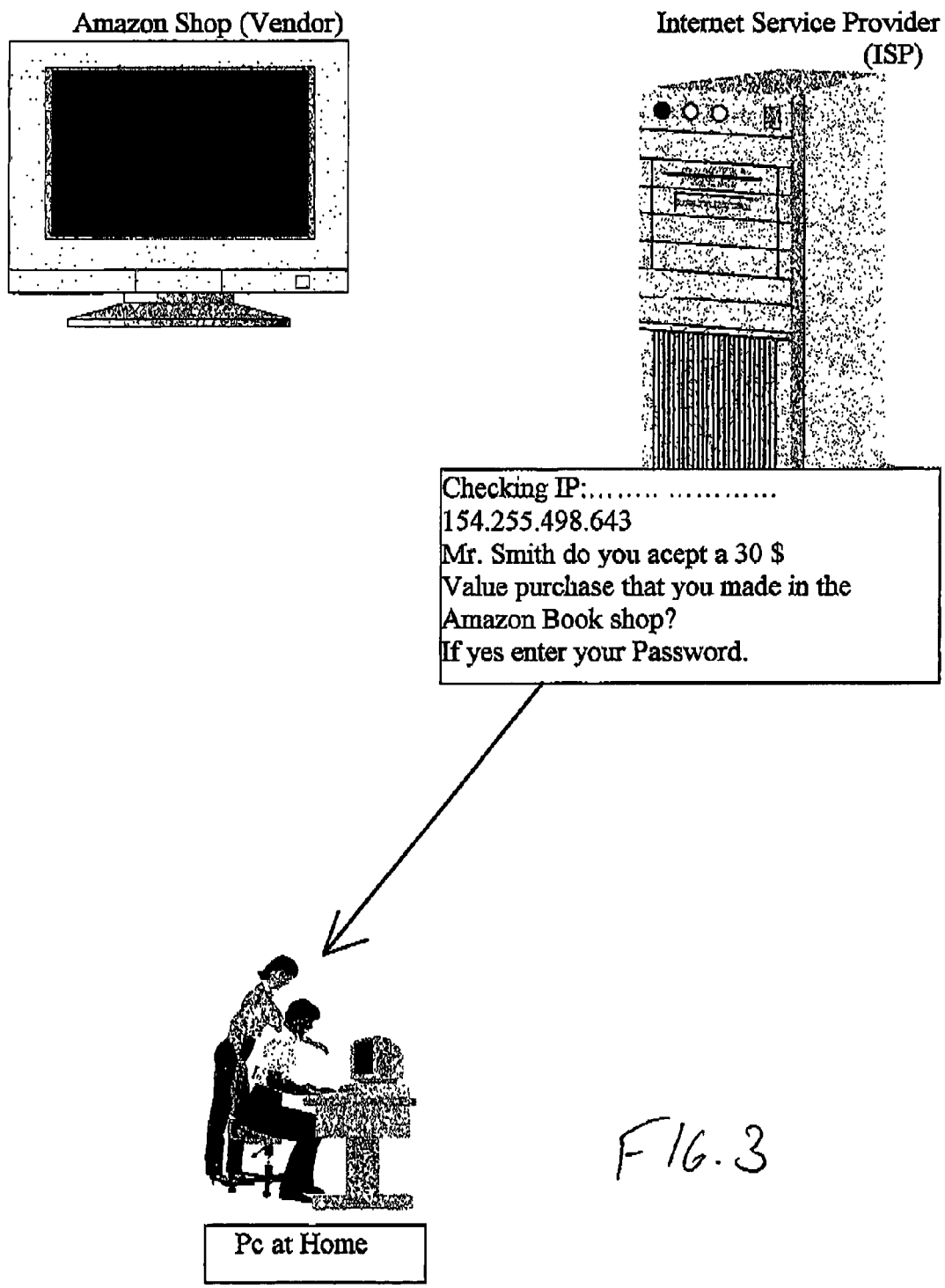
FIG. 3 shows the ISP computer confirming that correct IP address is active with buyer's computer and requesting confirmation of buyer's transaction.
Figure 4:
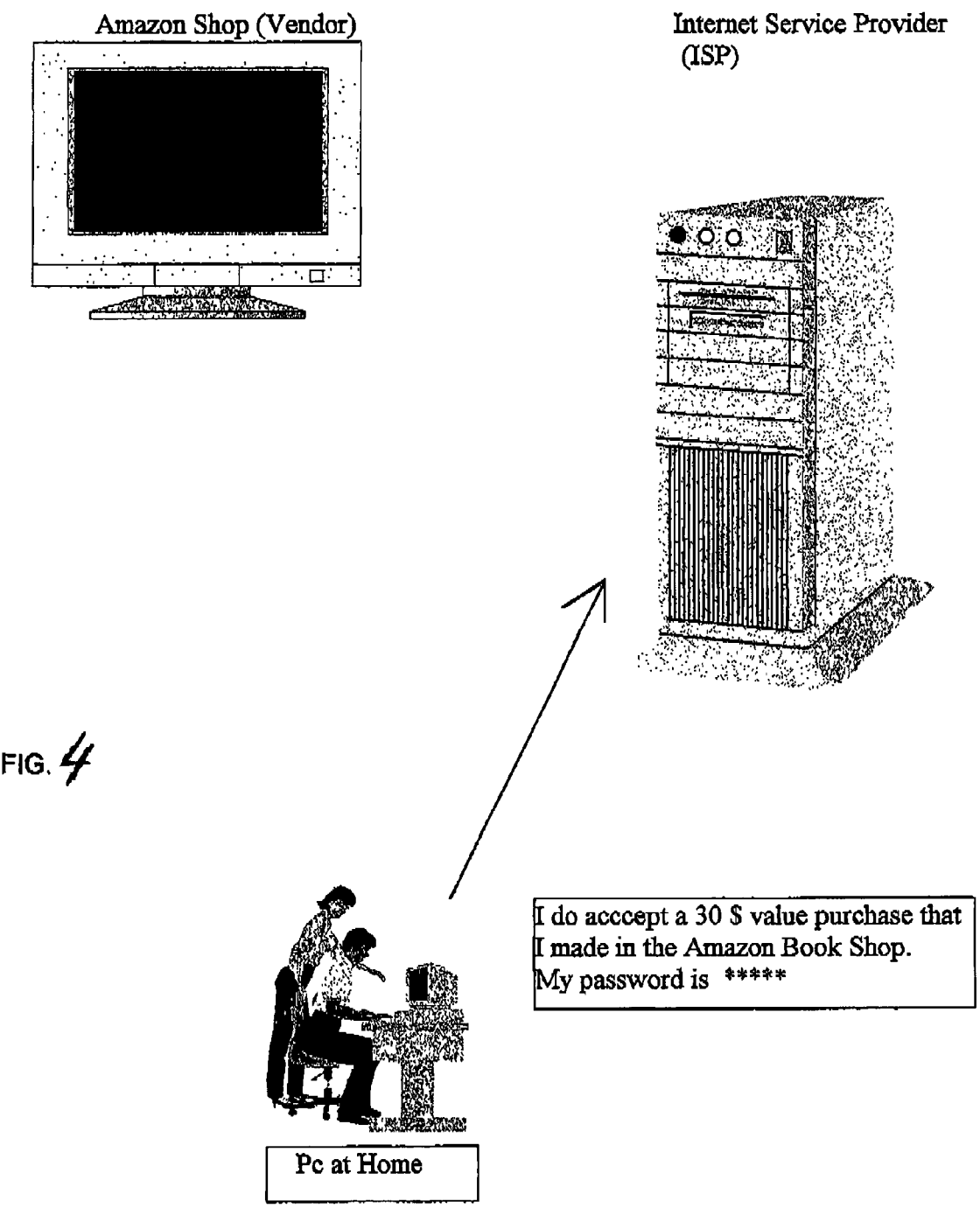
FIG. 4 shows buyers computer responding to ISP computer's request for confirmation.
Figure 5:
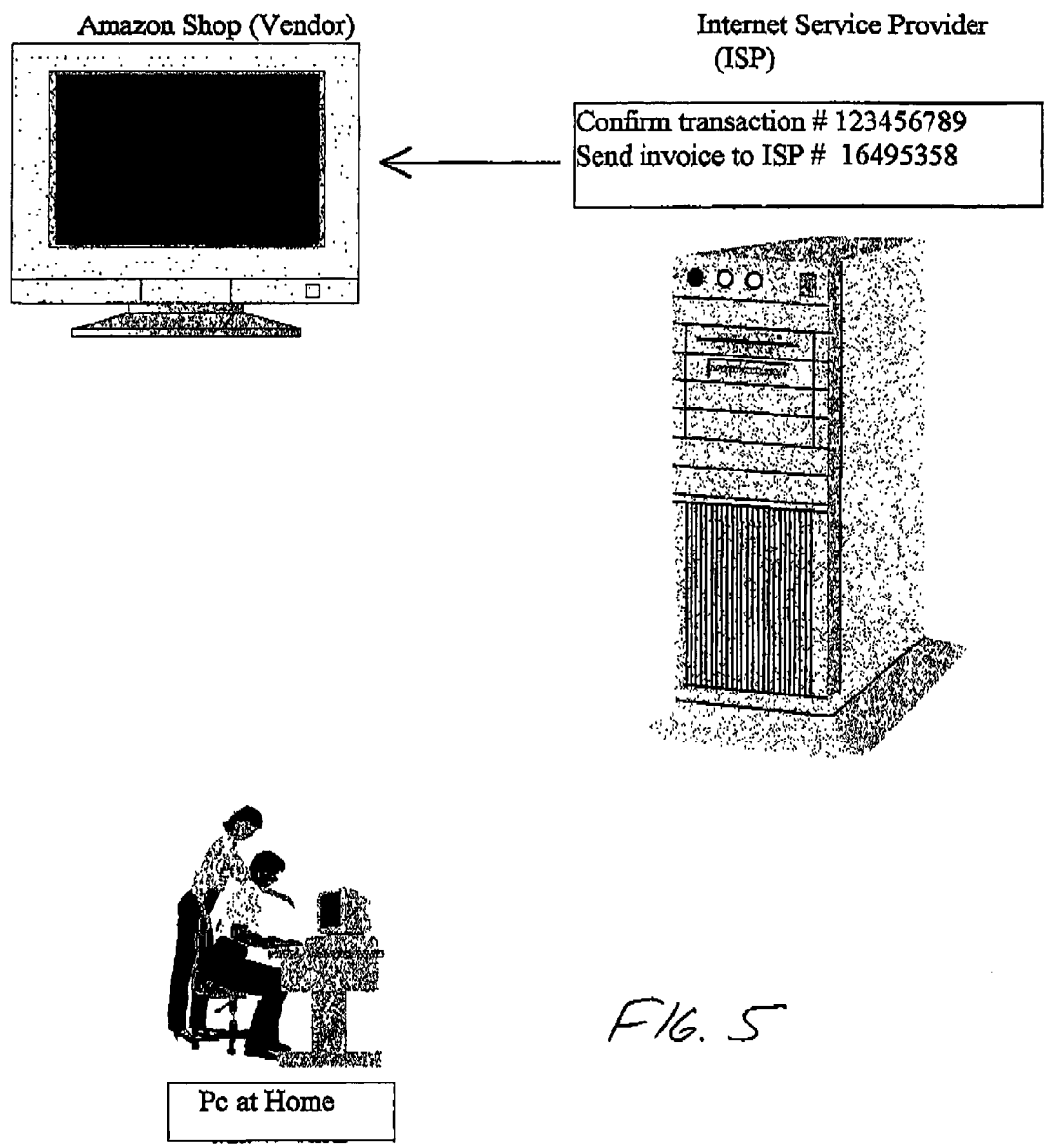
FIG. 5 shows ISP computer's transmission of a confirmation code and invoicing instructions to vendor's computer.
Figure 6:
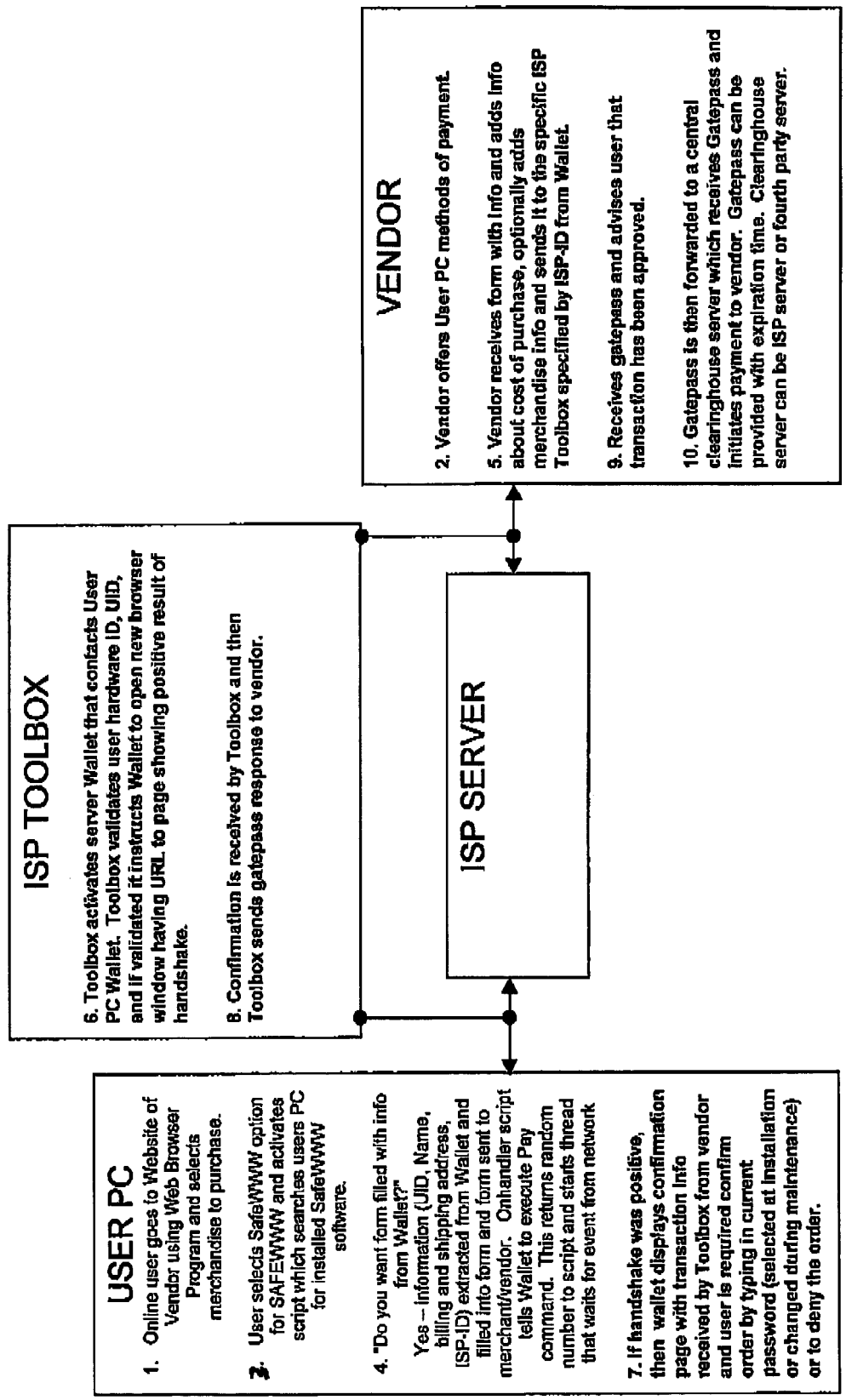
FIG. 6 shows a block diagram illustrating another exemplary embodiment of the present invention.

As was mentioned hereinabove, in one exemplary embodiment of the invention, the credit account for the subscriber (also referred to as an end user or Buyer) is established in the normal manner usually by providing credit card information to the ISP by conventional means, such as by voice telephony, fax transmission or check. In most ISP-end user relationships, the ISP has been given credit card information and this information is on file with the ISP and available to the ISP's computers. In return for receiving payment, the ISP provides a gateway to the Internet for the end-user's use. The end-user (or subscriber) is provided with software means and identification codes for dialling directly into the ISP's computers. The ISP's computers assign an Internet Protocol (hereinafter "IP") address to the subscriber for use during the particular on-line session in progress. The subscriber's computer transmits messages which are received by the ISP computer and relayed through the IP address and out onto the Internet to the ultimate intended recipient computer. During the entire time the on-line session in progress, the IP address does not change and is thus available as identifying information. By monitoring and occasionally re-verifying that the subscriber's computer is still on-line at the assigned IP address, the ISP can confirm that certain activities could be attributed to the subscriber.

This exemplary embodiment of the present invention takes advantage of the intimate relationship which is re-created every time an Internet subscriber's computer goes online and signs into his ISP's computer by assigning to the ISP computer the function of clearinghouse and active intermediary between the subscriber's computer and the vendor's computer.

The method is described with reference to the drawings described hereinabove as follows:

The ISP (also referred to hereinafter as a "Clearinghouse Computer") is assigned a unique ISP-ID code.

As described hereinabove, the ISP's subscriber or customer (hereinafter "Buyer") has gained the ability to access the Internet network from his remote computer by opening an account with ISP.

The Buyer has provided credit card or other payment information to the ISP when the account was opened, by conventional mail, fax, voice telephony or any other acceptable method including known methods. In exchange, Buyer receives from the ISP certain software and identification codes which permit Buyer's computer to communicate with the ISP's computers and to negotiate (request and obtain) an IP address.

At time of first sign-on, Buyer's Computer (hereinafter referred to as "BC") transmits to BC a Buyer-ID code which is electronically recorded or written into a file (e.g. a cookie file) on BC. The Buyer ID code could be generated by any number of methods known in the art for generating identification codes.

When Buyer activates his BC to log onto ISP network (BC provides standard log-in information to ISP), ISP also reads and logs in Buyer-ID code and assigns IP address for current session to BC.

BC connects via ISP portal with Merchant Computer (MC) and Buyer selects desired merchandise and further selects to pay using Security program manager payment method disclosed hereinbelow.

Buyer-ID and BC's IP address assigned for current session are provided to MC programmed to request and receive said information MC is programmed to use Buyer-ID and BC's current IP address along with information such as desired item ID, cost and name for generating an electronic purchase inquiry which is transmitted through the network to ISP.

ISP is programmed such that upon receipt of purchase inquiry from MC, ISP uses combination of IP address and Buyer-ID to determine within ISP's internal network whether Buyer is in fact still online at the address assigned at the beginning of the online session.

If ISP computer is unable to confirm that BC is still connected to ISP system at the IP address expected, or that the BC IP address given by MC is different from that assigned by ISP to BC, then a negative message is generated by ISP's computer and transmitted to MC thereby resulting in the early termination of the purchase transaction process by MC. ISP's computer may alternatively be programmed to conduct other tests or inspect for other necessary conditions in an attempt to verify the source of the order placed with MC.

If BC is determined to be connected to ISP at correct address, ISP sends message containing details of purchase inquiry to BC asking Buyer to input confirmation of details of purchase desired to be transacted with MC.

Upon input of confirmation command by Buyer into BC, BC generates and transmits a confirmation to ISP.

On receipt of Buyer's confirmation, ISP then generates and transmits a Transaction Confirmation Number and instructs MC to proceed with filling Buyer's order and also to generate and forward an invoice to ISP.

The invoice to the ISP can be generated electronically and transmitted directly to ISP's computer, instantaneously (during the same session) or MC might wan until receiving programming indicating that the order has actually been filled.

Receipt of the invoice by ISP's computer then causes the ISP computer to generate and transmit, either electronically or through conventional means, an instruction to Buyer's credit card company to debit Buyer's account for the amount of the purchase. Alternatively, ISP could bill Buyer directly or any other reimbursement arrangement, e.g. through an insurance fund, is contemplated herein.

In another exemplary embodiment of the present invention, either the ISP's server acts as the security coordinator or a black box (hereinafter "ISP Toolbox") is located at the site of the ISP server. The following description will describe the embodiment where the security coordinator functions are carried out by an ISP Toolbox.

Physical Placement of ISP Toolbox—

In this exemplary embodiment, the ISP Toolbox is located at the physical site of the ISP, the ISP Toolbox is connected to the phone or communication lines coming into the ISP server directly from users on one side of ISP server. The ISP Toolbox is also connected to lines going out to the Internet (via the modem basket) from the ISP server. The ISP Toolbox doss not interact directly with the ISP server. For the most part, it monitors incoming and outgoing traffic, waiting to take over those communications should a security related transaction be called for by a home user.

The ISP Toolbox is essentially a mini-server, dedicated to the security tasks assigned to it. The ISP Toolbox is provided with programming which, when activated, will send, receive and verify the proper forms and/or data to either a participating home user, ISP server or vendor in order to carry out the proposed transaction. The following scenario describes what can happen when a request for such a security related transaction is detected by the ISP Toolbox.

As will be further described hereinbelow, in another exemplary embodiment, the Toolbox is not located at the ISP but at the site of another credit provider.

1. Application Process—This process only needs to occur once for each account which a user might have:
   a) In order to begin participation in the secure transaction system installed by his or her ISP, a User at home connects his home PC with the server of the ISP with whom the home user has established an ISP-user relationship. Upon establishing direct dial-up communications with the ISP server, the home user activates a file on ISP Website, for example by clicking a button presented on his browser using his input device, which alerts the ISP Toolbox to user's request for an application to enroll user's PC in system of the invention.
   b) The ISP Toolbox supplies an apply.asp (".asp" denotes an active server page) file to the browser application, such as Netscape Company's Navigator® or Communicator® browser applications or Microsoft Corp.'s Internet Explorer® applications. The user fills in the requested information into the form and clicks on a submit button on his display. The apply.asp submits a new application record bearing the user's ISP user name back to the ISP Toolbox which in turn notifies the ISP, for example by way of an email bearing a URL link to the application form, that a request for credit has been made. A credit decision on the application is then made either electronically at the level of the ISP based on predefined or by a human credit manager. The ISP verifies the username and e-mail address of the user and sets a credit limit. The account is marked as "activated" by the setting of an approved credit limit which initiates promotion by the ISP toolbox of the user record from application status to active account status.

2) Activation of the account initiates a process by which the ISP toolbox generates a UID or unique identification for the user. The ISP toolbox then generates and transmits an e-mail to the user which contains a link to a registration URL. When the user opens the e-mail and clicks on the registration URL, it downloads and activates an installation page and a system file from the ISP Toolbox, containing a Locator which comprises an <OBJECT> tag, the tag pointing to a GUID (Unique ID generator) and a codebase. The Locator is installed in the user's browser cache and an instance thereof is blown inside the HTML page object module.

3) The ISP Toolbox asks user to inspect his/her personal data, to choose a personal password and click an icon or button to finish activation of the new account. Clicking the button causes the onsubmit handler which came as part of the Locator, to start running a script which takes the user information, UID and further information about the user's computer and sends these back to the ISP Toolbox.
   a) Stupid agent—directs user to most recent client software.
   b) Client software—encryption and decryption and retrieving data from wallet kept in registry, i.e.

4) Generation of GUID by Black Box

5) Describe purchasing session.
   a) Online user goes to Website of merchant using any Web Browser Program and selects merchandise to purchase.
   b) User is offered methods of payment and selects option button for "SECURITY PROGRAM MANAGER" or "SAFE PAY OPTION".
   c) In an Autofetch process, an OnChange script handler in User's software prepares and sends request to Security program manager server for Session User identity.
   d) Security program manager server redirects request to user's black-box equipped ISP.
   e) ISP black box searches its files and returns users identity.
   f) A user form is generated by user's computer and populated with user information including identity returned in step (e) from ISP black box.

g) The form is submitted, together with a challenge which is forwarded to the vendor server.
h) Vendor server runs a script that calls the Security program manager server's getGatePass.asp, thereby transmitting the Session User identity, IP (user's current IP address), Sum and the challenge.
i) The Security program manager center redirects the vendor server's call to the ISP identified by the IP while the user stands by.
j) The ISP's getGatePass.asp runs a check of the IP provided as part of the vendor servers call against the internally known IP to make the sure that is where the user really is logged in. If the IP test fails, the vendor server receives a rejection notification from the ISP server and the transaction is terminated.
k) If the IP test succeeds (i.e. the user really is connected to the correct IP address) then the ISP challenges the home listener.

The examples discussed herein and demonstrated by the Figures are merely for llustrative purposes only. Variations and modifications of the disclosed invention in a manner well within the skill of the man of average skill in the art are contemplated and are intended to be encompassed within the scope and spirit of the invention as defined by the claims which follow.

Figure 7:
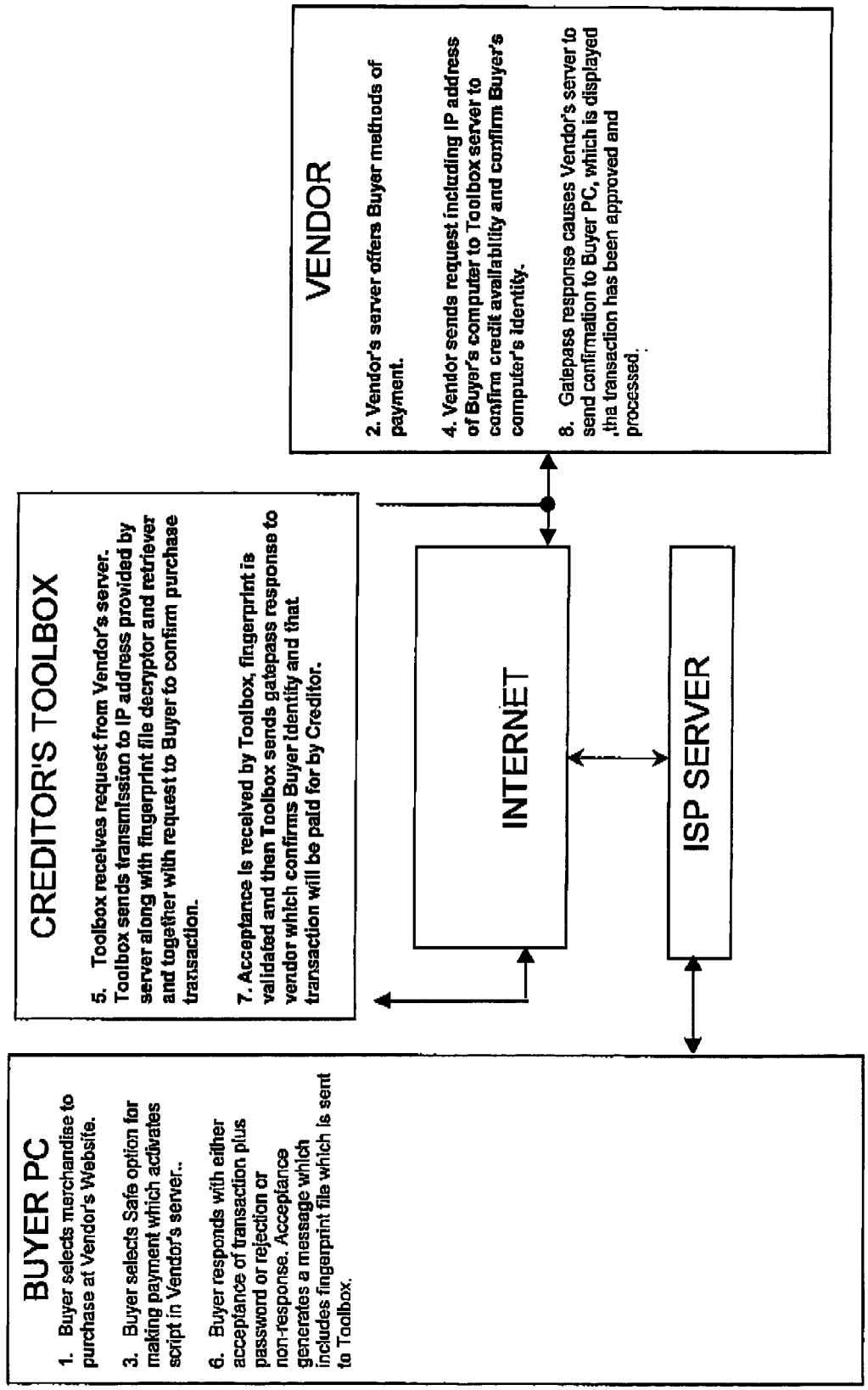
FIG. 7 shows a block diagram illustrating another exemplary embodiment of the present invention.

For example, in another exemplary embodiment the ISP is not the site where the Toolbox resides. With reference to FIG. 7, The Toolbox could be physically located at the site of the credit provider ("Creditor"), e.g. online-enabled bank, credit card provider or other affinity-card or charge account provider (including brick-and-mortar retailer's with an online presence such as Macy's) and in communication through normal channels with Creditor's transactional server. In this case, the ISP would not be an active part of the purchase transaction, other than in the usual known way by giving User access to the Internet. Generally, except as specified hereinbelow, the rest of the process proceeds substantially as described hereinabove. Specifically, in this exemplary embodiment, the account is set up as follows:

1) In order to subscribe to or begin participation in the secure transaction system in which his Creditor also participates, a User at home connects his home PC with the Internet via an ISP. Upon establishing communications with the Creditor server, user activates a getapplicatlon file on Creditors Website, for example by clicking a button presented by users browser using his input device, which alerts the Creditor Toolbox to user's request for an application to enroll user's PC in system of the invention. The system is specific to the user PC which is enrolled as will be further elaborated hereinbelow.
2) The Creditor's Toolbox supplies an apply.asp (".asp" denotes an active server page) file to the browser application. The user fills the requested information into the form; usually this will include a user name (either new or pre-existing), a requested credit line, and an e-mail address which is accessible from the PC, laptop or other client computer from which user wishes to be able to make purchases. The apply.asp also includes diagnostic programming which is activated when user clicks on the submit or sign up button on his display. At that point, the apply.asp "reads" diagnoses whether the user's PC has labelled certain components which can be used for generating a fingerprint file for helping to verify user's PC's identity in future functions. Certain basic information is "read" and is transparently submitted by the apply.asp along with the user-provided information in the form of a new application record bearing the users IP address back to the Creditor's Toolbox.
3) The application is processed by a credit-decision maker. This may be either done automatically by Creditor's server based on pre-definable parameters and access to users credit particulars and the particulars provided in the application, or by a human credit operator who manually opens the application record by accessing the Toolbox Administration Center Website and selects the option to Accep/(reject new applications. Either way, a credit decision on the application is made and a credit limit is set or the application is rejected. If rejected, an e-mail is generated to inform user.
4) If the application is accepted, the account is marked as "activated" by the setting of an approved credit limit which initiates promotion by the Creditor Toolbox of the user record from application status to active account status. Activation of the account also initiates a process by which the Creditor Toolbox generates a fingerprint file including a unique identification ("UID") for the user using the identifying characteristics of user's PC which were diagnosed by the apply.asp and accompanied the application (e.g. CPU ID number, hard disk serial number, amountg of RAM, BIOS version and type, etc.). User is notified via an e-mail sent to the e-mail address specified in the application. The e-mail includes a notification of what credit line has been set and it also includes a hypertext link, e.g. "Please click here to activate your account". When user clicks on the link which Is also a registration URL, it downloads and activates an installation page and system files from the Creditor's Toolbox, including a Locator which comprises an <OBJECT> tag, the tag pointing to a GUID (Unique ID generator) and a codebase (encryption and decryption programs, a handshake code generating program, and a challenge generating program are among the files downloaded for future use by the user PC; these may also be useful for retrieving encrypted data from the wallet kept in user's PC registry). The Locator is installed in the user's PC and an instance thereof is blown inside the HTML page object module. The above step occurs only after the link activates a file which reads the identity numbers of the various components of user's PC to make sure that the user PC is the same one from which the application was generated in Paragraph 2 hereinabove. If in fact it appears to be the same user PC, then the rest of the download takes place.
5) The Creditor Toolbox asks user to fill in her selected password again and to fill in her personal data, and click an icon or button to finish activation of the new account. Clicking the button causes the onsubmit handler which came as part of the Locator, to start running a script which takes the user information, UID and further identifying information about the user's computer and sends these back to the Creditor's Toolbox for future reference.
6) Another of the items which may have been downloaded into User's computer is a Stupid agent which directs User's computer to the most recent client software available, either from the Creditor Toolbox or from a Security Management Website. This stupid agent is activated at the beginning of any purchase transaction, to ensure that User has the most recent agents to permit the transaction to work, and optionally to provide Creditor Toolbox or the Security Management Website with an opportunity to verify that certain identifying factors of User's system have not changed, as a security spotcheck.

7) A participating Merchant agrees to participate in the Safe system of the invention and does so by incorporating source code provided by the Security Program Manager into his "Select Payment Method" Web page. This [I] creates an option for payment using the Safe system of the invention, which when activated by a user, causes Merchant server to take users IP address and send a request to Creditor Toolbox asking for verification (a) that user having IP address provided is actually online and placing an order having a certain purchase value and (b) that user has a sufficient credit limit to place an order of that value and (optionally) that Creditor has agreed honor a demand for payment of said purchase. The full cycle of a transaction will be described more completely and in greater detail hereinbelow.

With reference to FIG. 7, it can be seen that a typical purchasing session in this exemplary embodiment proceeds as follows:

a) User PC goes online and user points his browser to the Website of a Merchant server using any Web Browser Program; downloads files depicting merchandise for sale and selects merchandise to purchase which generates a purchase request to Merchant's server, all in a manner well known in the art.

b) Merchant's server sends back to user PC an order page or pages which typically includes a transaction number, the value of the order, and asks for billing information, shipping information. At some point, user is offered to indicate her desired method of payment and selects option button which designates the Safe payment plan of the present invention, e.g. "SAFE OPTION".

c) Selection of the "Safe Option" generates a message back to Merchant's server which includes user's IP address and instructs Merchant's server to forward a request to Creditors Toolbox to confirm that the user at the IP address provided is (a) actually and actively online and trying to make this purchase, and (b) that the user at the IP address has the necessary credit to make such a purchase.

d) Upon receipt of the request from Merchant's server, Toolbox immediately sends a transmission to the IP address provided by Merchant's server. The transmission includes files which (a) search for, decrypt and read the UID files in user's PC to see who it is, (if the PC is a machine registered in the system) and (b) which generate a Pop-up message on the registered user's browser to make sure that the transaction is desired by the Safe system registered user. The message advises that a transaction having a particular value is being requested and asks for confirmation or rejection of the transaction. To reject the transaction, user can actively Reject by pressing a Reject button or simply by not responding within a pre-determined default time. To accept the transaction, the user must provide his user password and submit the form back to the Toolbox. The form is accompanied transparently by the fingerprint file containing the UID and other machine identifying information decrypted and extracted from user's PC by the transmission from the Toolbox.

e) If accepted by user, then Toolbox checks database to make sure user's credit limit is not exceeded and sends a coded confirmation to Merchant's server that the transaction is confirmed and will be paid for by Creditor on behalf of user. Merchant then sends HTML message to advise user that the identified transaction has been successfully processed.

f) As described hereinabove, if user either actively Rejects or fails to respond to the Pop-up message in a predetermined time period, for example, 2 minutes, the Pop-up message disappears and Toolbox advises Merchant's server that the transaction is not accepted. Optionally, provision can be made where user can label a tendered transaction as "suspicious" and reject an order with prejudice, thus alerting both Toolbox and Security Program Manager, and therefore Merchant, that some attempt was made to defraud Merchant. Obviously, this knowledge can provide great benefits in aiding to track down cyber credit frauds and inhibit criminal activity.

Figure 8:
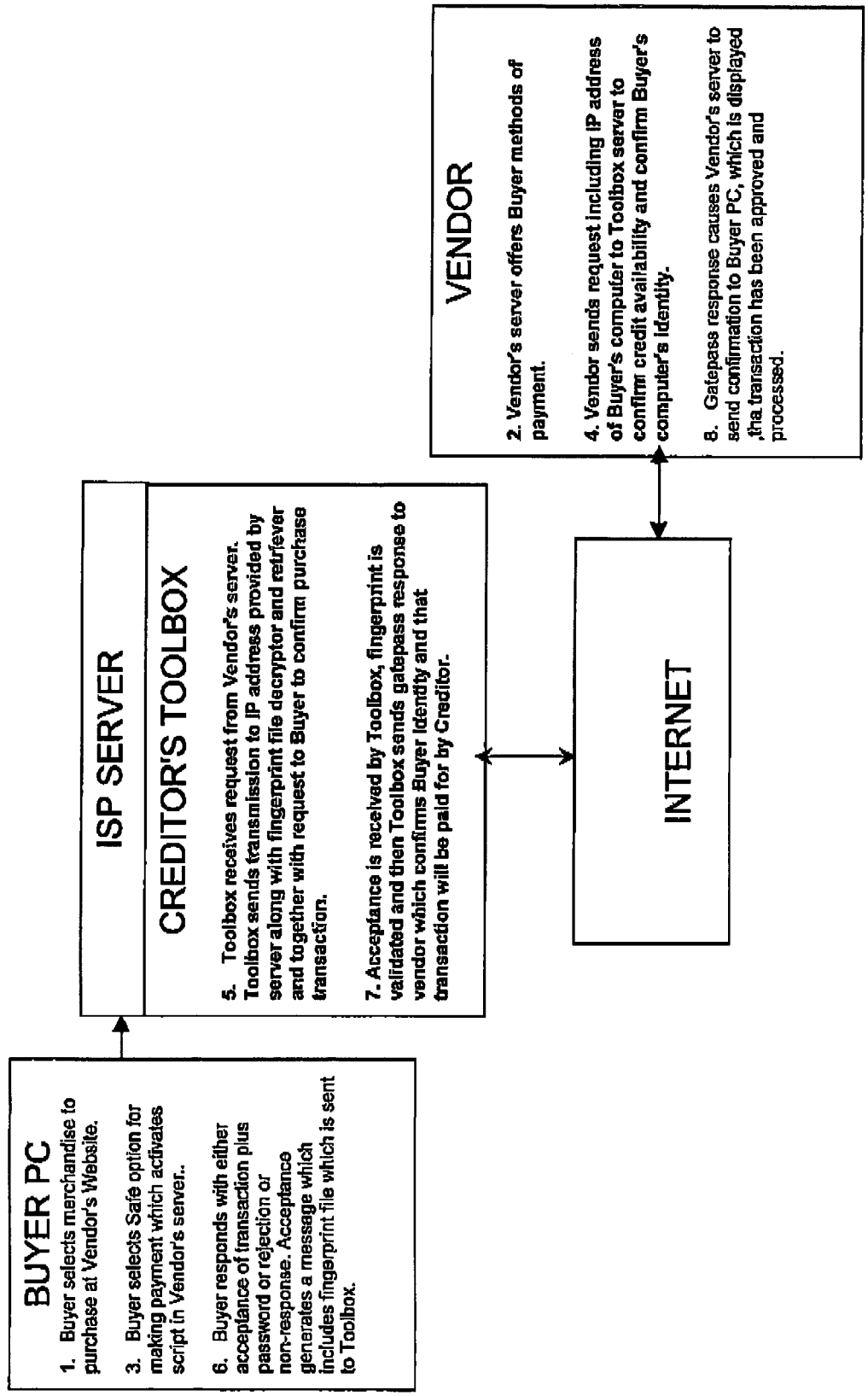
FIG. 8 shows a block diagram illustrating another exemplary embodiment of the present invention.

In another exemplary embodiment, shown in FIG. 8, the Creditor server is also an ISP server, or at least they are at the same location and being serviced by the same modem basket. The Toolbox is still situated at that location as well. Thus, a bank which offers ISP services to it's on-line customers can also offer them the safety of the Safe transaction system and method, which is carried out by the Toolbox right on the bank's/ISP's premises.

I claim:

1. A computer-implemented method comprising:
    receiving, by a toolbox from a merchant computer, an IP address and an inquiry whether a user computer is online at the IP address;
    confirming, by the toolbox, that the user computer is online at the IP address, wherein the confirming comprises,
    transmitting a file to the IP address;
    receiving acceptance of an online purchase from the user computer by receiving, based on the transmission of the file, identification information of the user computer;
    verifying the identification information of the user computer;
    determining that a credit limit associated with a user of the user computer is not exceeded; and
    sending, based on the determining, a confirmation of the online purchase to the merchant computer.

2. The computer-implemented method of claim 1, wherein the toolbox is located within an internet service provider.

3. The computer-implemented method of claim 2, wherein the toolbox is located outside an internet service provider.

4. The computer-implemented method of claim 1, wherein the identification of the user computer identifies one or more components of the user computer.

5. The computer-implemented method of claim 1, wherein the identification of the user computer includes one or more of a central processor unit identification number, hard disk serial number, amount of random access memory, and basic input/output system version.

6. One or more machine-readable storage medium including instructions which, when executed by one or more machines, cause the one or more machines to perform operations comprising:
    receiving, by a toolbox from a merchant computer, an IP address and an inquiry whether a user computer is online at the IP address;
    confirming, by the toolbox, that the user computer is online at the IP address, wherein the confirming comprises,
    transmitting a file to the IP address;
    receiving acceptance of an online purchase from the user computer by receiving, based on the transmission of the file, identification information of the user computer;
    verifying the identification information of the user computer;
    determining that a credit limit associated with a user of the user computer is not exceeded; and sending, based on the determining, a confirmation of the online purchase to the merchant computer.

7. The machine-readable storage medium of claim 6, wherein the toolbox is located within an internet service provider.

8. The computer-implemented method of claim 6, wherein the toolbox is located outside an internet service provider.

9. The computer-implemented method of claim 6, wherein the identification of the user computer identifies one or more components of the user computer.

10. The computer-implemented method of claim 6, wherein the identification information of the user computer includes one or more of a central processor unit identification number, hard disk serial number, amount of random access memory, and basic input/output system version.

11. A system comprising:
a processor and memory,
the memory containing instructions that when executed by the processor performs operations including,
receiving, by a toolbox from a merchant computer, an IP address and an inquiry whether a user computer is online at the IP address;
confirming, by the toolbox, that the user computer is online at the IP address, wherein the confirming comprises,
transmitting a file to the IP address;
receiving acceptance of an online purchase from the user computer by receiving, based on the transmission of the file, identification information of the user computer;
verifying the identification information of the user computer;
determining that a credit limit associated with a user of the user computer is not exceeded; and
sending, based on the determining, a confirmation of the online purchase to the merchant computer.

12. The system of claim 11, wherein the toolbox is located within an internet service provider.

13. The system of claim 11, wherein the toolbox is located outside an internet service provider.

14. The system of claim 11, wherein the identification of the user computer identifies one or more components of the user computer.

15. The system of claim 11, wherein the identification information of the user computer includes one or more of a central processor unit identification number, hard disk serial number, amount of random access memory, and basic input/output system version.

* * * * *